Aug. 5, 1952 W. AMES 2,605,551
OPPOSED CONTACT DISTANCE MEASURE
Filed April 11, 1951
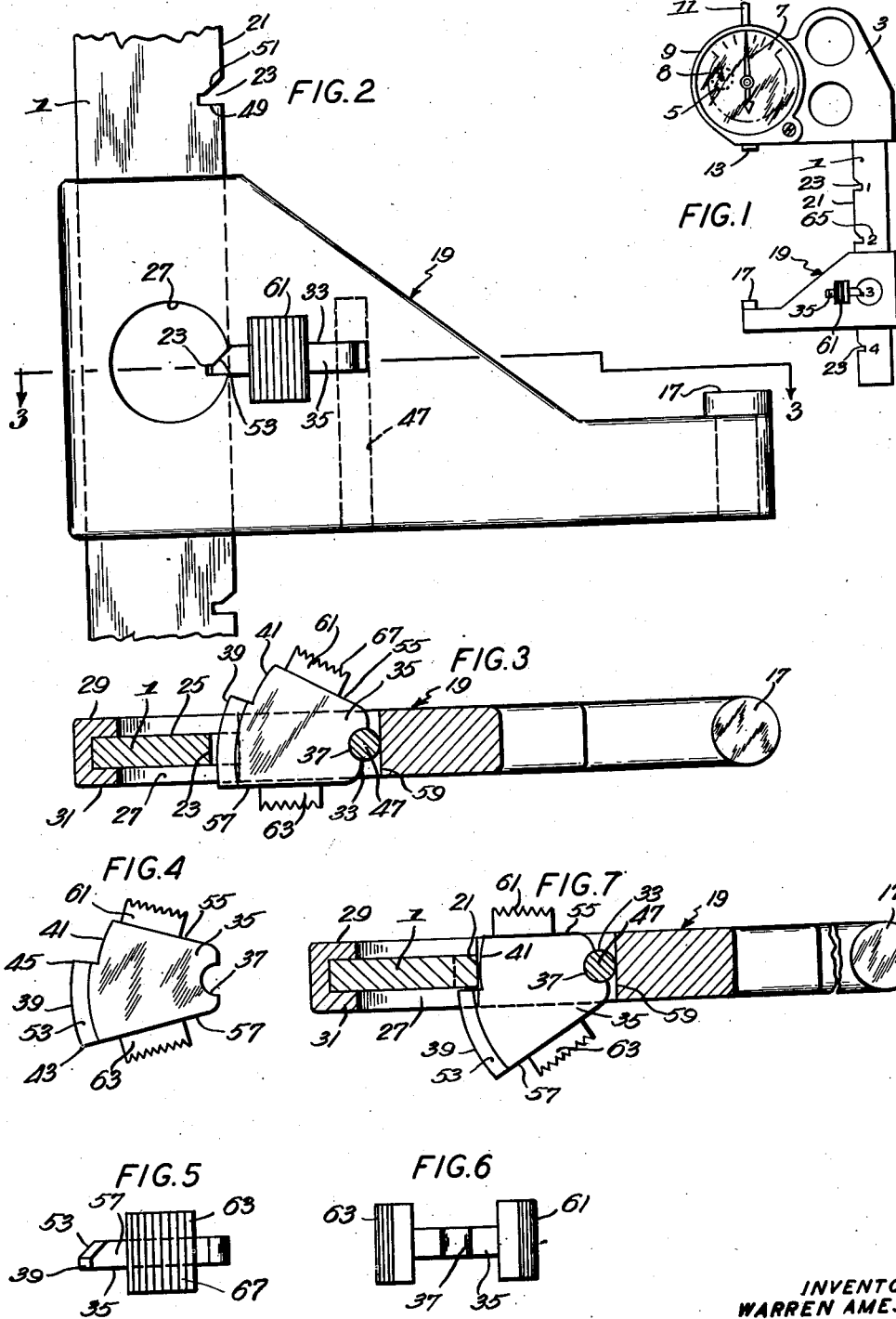
INVENTOR
WARREN AMES Patented Aug. 5, 1952

2,605,551

UNITED STATES PATENT OFFICE 2,605,551

OPPOSED CONTACT DISTANCE MEASURE

Warren Ames, Newton, Mass., assignor to B. C. Ames Co., Waltham, Mass., a corporation of Massachusetts Application April 11, 1951, Serial No. 220,401

4 Claims. (Cl. 33—147)

My invention relates to distance measures of the type in which the work is calipered between opposed work contacts carried by an elongated bar or beam, the present invention constituting an improvement in the measure shown by my pending application Serial Number 83,564, filed March 26, 1949, now Patent No. 2,553,397.

The invention and its objects will be best understood from the following description when read in the light of the accompanying drawings of an embodiment of the invention selected for illustrative purposes, while the scope of the invention will be more particularly pointed out in the appended claims.

In the drawings:

Fig. 1 is a front elevation of a distance measure according to the invention;

Fig. 2 is an elevation of the slidable head of the measure as viewed from the under side of Fig. 1, on an enlarged scale, corresponding to Fig. 3 as viewed from its under side;

Fig. 3 is a section on the line 3—3 of Fig. 2;

Fig. 4 is an elevation of the locking plate;

Fig. 5 is a bottom view of the locking plate as viewed in Fig. 4;

Fig. 6 is an end view of the locking plate as viewed in Fig. 5; and

Fig. 7 is a view corresponding to Fig. 3 with the parts in different operative positions.

As illustrated in the drawings, the measure comprises a bar or beam 1 which at one end rigidly carries a flat plate-like head 3 projecting laterally from one edge thereof. This head 3 at its outer end portion carries a dial micrometer gauge having a flat graduated dial 5 with which cooperate movable pointers 7 and 8, the casing 9 of the gauge being relatively thin so as to project but a slight distance from the under side of the head as viewed in Fig. 1. Extending through the casing is a contact feeler rod 11 which at its lower end, as viewed in Fig. 1, carries a work contact 13. The contact feeler rod is normally held in its position shown by Fig. 1 by a tension spring forming part of the internal mechanism of the gauge, and is adapted to be pushed downward from that position by application of the operator's finger to the head 15 of the rod, which will move the work contact 13 at the other end of the rod into contact with one side of the work when the opposite side of such work is in contact with an opposed work contact 17 in alignment with the work contact 13. Such depression of the contact feeler rod will operate the internal mechanism of the gauge to rotate the pointers 7 and 8 relative to the dial 5 so that the thickness of the work where engaged by the two work contacts 13 and 17 may be accurately measured.

The work contact 17 is shown as carried by a head 19 slidably mounted on the bar 1. One edge 21 of this bar is provided with notches 23, while the slidable head is provided with releasable means for engaging those notches so that the head may be locked to the bar at selected positions along it. Conveniently, the notches are placed one inch apart, the pointer 7 making one revolution when the work contact 13 moves one-tenth of an inch, and the pointer 8 making one revolution when that work contact moves one inch, the portion of the dial cooperating with the pointer 7 being graduated into 100 divisions, and the portion of the dial cooperating with the pointer 8 being graduated into 10 divisions, so that the dial will readily indicate movements of the work contact 13 in one-thousandths of an inch.

As illustrated, the bar 1 is rectangular in cross-section, while the slidable head 19 is formed with a through opening 25 through which the bar extends, the walls of the through opening fitting the corresponding surfaces of the bar so that there will be no lateral lost motion between them. The head may be assembled with the bar by sliding it over the end of the latter, and may be removed from the bar by sliding it in the opposite direction. As further illustrated, the head 19 is provided with a circular opening 27 which intersects the opening 25 and opens at opposite ends on the opposite faces 29 and 31 of the head. Also the head is shown as provided with a narrow elongated slot 33 normal to the length of the bar 1, which slot opens on the opposite faces of the head and at one end intersects both the openings 25 and 27.

Within the slot 33 of the slidable head 19 is swingingly mounted a flat plate-like locking member 35 which snugly but slidably fits the opposite walls of the slot. This locking member, as shown, is formed at one end with an approximately semi-circular recess 37 and at its other end with an arcuate edge portion 39, which latter at one end is notched to form an arcuate edge portion 41 concentric with the semi-circular recess 37. The edge portion 39, however, is eccentric with relation to the semi-circular recess 37 in such way that the lower end 43 of said edge portion, as viewed in Fig. 4, is at a greater distance from the center of curvature of the recess than the upper end 45 of said edge portion, the radius of curvature of said edge portion preferably being constant. For swingingly mounting the locking plate, the head 19 fixedly carries a pin 47, of circular cross-section, which passes transversely through the slot 33, the semicircular recess 37 of the plate receiving this pin so that the plate is swingingly mounted upon the pin.

Each notch 23 in the bar 1 is shown as formed with an edge 49 normal to the edge 21 of the bar and with an opposite edge 51 which is inclined toward the edge 49 as it extends inward. The arcuate edge portion 39 of the locking plate 35 is shown as formed with a beveled surface 53 so that when the plate is swung upward from its position shown by Fig. 7 to its position shown by Fig. 3 to cause that edge portion to enter a notch 23 this beveled surface will, because of the eccentricity of said edge portion, coact with the inclined edge 49 of the notch and act as a wedge firmly to lock the sliding head to the bar 1. When the locking plate is in its position shown by Fig. 7, in which position the beveled edge portion 39 is below the bar 1 and the arcuate edge portion 41 of said plate is opposite the edge 21 of the bar, the head 19 may be slid along the bar to position the plate in registry with a selected notch 23.

In the position of parts shown by Fig. 7 the arcuate edge portion 41 of the locking plate 35 prevents that plate from moving far enough to the left to disengage the recess 37 of the plate from the pin 47. In a similar manner, when the locking plate is in its position shown by Fig. 3 and the beveled arcuate edge portion 39 of the plate is within one of the notches 23, that plate will be prevented from moving far enough to the left to disengage the recess 37 from the pin.

As shown, the opposite longitudinal edges 55 and 57 of the locking plate 35 converge toward each other as they extend toward the end of the plate having the recess 37, and in such way that the edge 57 is almost flush with the face 31 of the head 19 when the parts are in the position shown by Fig. 3, and the edge 55 flush with the face 29 of the head when the parts are in the position shown by Fig. 7. It has been found that when the head 19 is accidentally pulled off the bar 1, or is off the bar in assembling the head with the bar, the locking plate 35 tends to drop out of the slot 33, and that this tendency cannot be wholly satisfactorily eliminated by so shaping the recess 37 and that end of the locking plate which has such recess that they coact with the pin 47 and the adjacent end surface 59 of the slot 33 to limit the swinging of the plate in opposite directions. According to the present invention, to prevent the locking plate from falling out of the slot 33 under such conditions, said plate is shown as integrally formed at its edge 55 with a part 61 which laterally projects in opposite directions from the opposite faces of the plate so that such projecting portions lie against the face 29 of the head 19 when the parts are in their positions shown by Fig. 7, the edge 57 of the plate, as shown, being formed with a like projecting part 63 which is spaced but slightly from the face 31 of the head when the parts are in their positions shown by Fig. 3. If the head is accidentally pulled from the bar and the projecting part 61 is uppermost that part will rest against the face 29 of the head and frictionally prevent the locking plate from sliding far enough to the left, as viewed in Fig. 6, to disengage the recess 37 of the plate from the pin 47, while if the projecting part 63 is uppermost such part 63 will contact with the face 31 of the head to act in the same way, thus in each instance to prevent the plate, which because of its small size is rather light and not much frictional effort is required to prevent it from sliding to the left, from falling out of the slot. In assembling the head 19 and locking plate with the bar, the head conveniently may be held in tilted position to cause its left hand end, as viewed in Figs. 3 and 7, to be higher than its right hand end, which will insure while the head is being handled in making such assembly that the plate will not move to the left off the pin, while the projecting parts 61 and 63, depending upon which is the uppermost, will prevent the plate from swinging and falling from the slot. The opening 27 in the slidable head 19 is of such size as to permit the numerals 65, designating the notches on the bar 1, to be readily read, and also is of such size and shape to permit passage of at least one, and preferably both, of the projecting parts 61 and 63 of the locking plate 35 through it to permit assembly of such plate with the head. Conveniently, these projecting parts 61 and 63 are shaped to form finger pieces for engagement by the operator for moving the locking plate into its positions shown by Figs. 3 and 7, the outer surfaces of these projecting parts being conveniently serrated as indicated at 67. It will be understood that the construction is such that when the measure is laid upon a flat surface such as a table top, with the dial of the micrometer gauge facing upward so that it may be readily read, the projecting part 63 will lie against such surface and hence the laying of the measure upon such surface in that position will not act to release the locking plate from that notch 23 of the bar with which it is engaged.

It will be understood that within the scope of the appended claims wide deviations may be made from the form of the invention described without departing from the spirit of the invention.

I claim:

1. A distance measure having, in combination, an elongated flat bar carrying heads between which the work is calipered, one of said heads having a through opening through which the bar extends and slidably fits for slidably mounting said head on said bar, said bar on one edge thereof being formed with spaced notches; the slidable head also being formed with a perforation which opens on the opposite faces of said head and intersects said opening of said head, and further being formed with a narrow slot which opens at its edges on said opposite faces and communicates at one end with both said perforation and said opening of said head at that side of said perforation and that edge of said opening, respectively, which is adjacent the notched edge of said bar; a plate-like locking member in said slot; means comprising a recess and a part received by said recess, one on said member and the other on said slidable head, for swingingly mounting said member within said slot at a point remote from said bar, which part is removable from said recess by sliding said member along said slot toward said perforation of said slidable head when the latter is removed from said bar; said locking member having an arcuate edge adjacent the notched edge of said bar that is eccentric with respect to the axis of swinging of such member and is adapted to be received by and bind in said notches of said bar when said locking member is swung in one direction and to be removed from said notches when swung in the opposite direction, said member having a portion cooperating with the notched edge of said bar for holding in cooperating relation said part and recess when said member is swung to its position in which said arcuate edge is removed from said notches while said slidable head is on said bar; and laterally projecting parts on said locking member adapted to engage the opposite faces of said slidable head for limiting the swinging of said member in each of opposite directions when said slidable head is removed from said bar; said perforation of said slidable head being of such size and shape as to permit passage therethrough of at least one of said projecting parts when said slidable head is removed from said bar and such projecting member is positioned in registry with said perforation, whereby to permit assembly of said locking member with said slidable head and its removal therefrom.

2. A distance measure having, in combination, an elongated flat bar carrying heads between which the work is calipered, one of said heads having a through opening through which the bar extends and slidably fits for slidably mounting said head on said bar, said bar on one edge thereof being formed with spaced notches; the slidable head also being formed with a perforation which opens on the opposite faces of said head and intersects said opening of said head, and further being formed with a narrow slot which opens at its edges on said opposite faces and communicates at one end with both said perforation and said opening of said head at that side of said perforation and that edge of said opening, respectively, which is adjacent the notched edge of said bar; a plate-like locking member in said slot; means comprising a recess and a part received by said recess, one on said member and the other on said slidable head, for swingingly mounting said member within said slot at a point remote from said bar, which part is removable from said recess by sliding said member along said slot toward said perforation of said slidable head when the latter is removed from said bar; said locking member having a portion adjacent the notched edge of said bar adapted to engage the notches of said bar when swung in one direction and to be removed from said notches when swung in the opposite direction, and having a portion adapted to cooperate with the notched edge of said bar for holding in cooperating relation said part and recess when said member is swung to its last mentioned position; and laterally projecting parts on said locking member adapted to engage the opposite faces of said slidable head for limiting the swinging of said member in each of opposite directions when said slidable head is removed from said bar; said perforation of said slidable head being of such size and shape as to permit passage therethrough of at least one of said projecting parts when said slidable head is removed from said bar and such projecting member is positioned in registry with said perforation, whereby to permit assembly of said locking member with said slidable head and its removal therefrom.

3. A distance measure according to claim 1 in which the laterally projecting parts of the plate-like locking member are finger pieces for engagement by the operator for forcing said member into and out of engagement with the notches of the bar.

4. A distance measure according to claim 2 in which the laterally projecting parts of the plate-like locking member are finger pieces for engagement by the operator for forcing said member into and out of engagement with the notches of the bar.

WARREN AMES.

No references cited.